US011913262B2

(12) United States Patent
Wleklinski, III et al.

(10) Patent No.: US 11,913,262 B2
(45) Date of Patent: Feb. 27, 2024

(54) SINGLE AXIS ADJUSTMENT FEATURE FOR FLUSH DOOR HANDLES

(71) Applicant: Illinois Tool Works Inc., Glenview, IL (US)

(72) Inventors: Thaddeus Wleklinski, III, Hammond, IN (US); Walter Belchine, III, Plainfield, IL (US); Justin L. Ruzich, Frankfort, IL (US)

(73) Assignee: Illinois Tool Works Inc., Glenview, IL (US)

( * ) Notice: Subject to any disclaimer, the term of this patent is extended or adjusted under 35 U.S.C. 154(b) by 491 days.

(21) Appl. No.: 17/132,332

(22) Filed: Dec. 23, 2020

(65) Prior Publication Data

US 2021/0108448 A1 Apr. 15, 2021

Related U.S. Application Data

(63) Continuation of application No. 15/551,475, filed as application No. PCT/US2016/018621 on Feb. 19, 2016, now Pat. No. 10,876,327.

(60) Provisional application No. 62/134,677, filed on Mar. 18, 2015.

(51) Int. Cl.
*E05B 79/06* (2014.01)
*E05B 85/10* (2014.01)
*E05B 81/76* (2014.01)

(52) U.S. Cl.
CPC .............. *E05B 79/06* (2013.01); *E05B 81/76* (2013.01); *E05B 85/103* (2013.01); *E05Y 2600/10* (2013.01); *E05Y 2900/531* (2013.01); *Y10T 292/1099* (2015.04)

(58) Field of Classification Search
None
See application file for complete search history.

(56) References Cited

U.S. PATENT DOCUMENTS

| | | | |
|---|---|---|---|
| 646,465 | A | 4/1900 | Seely |
| 688,920 | A | 12/1901 | Beecher |
| 937,577 | A | 10/1909 | Crump |
| 1,697,282 | A | 1/1929 | Morgan |
| 1,762,447 | A | 6/1930 | Lowes |
| 3,151,350 | A | 10/1964 | Manion |
| 3,319,509 | A | 5/1967 | Costantino |
| 3,393,423 | A | 7/1968 | Adams |

(Continued)

FOREIGN PATENT DOCUMENTS

| | | | |
|---|---|---|---|
| CN | 101260750 | A | 9/2008 |
| CN | 203808671 | U | 9/2014 |

(Continued)

OTHER PUBLICATIONS

International Search Report and Written Opinion for PCT/US2016/018621.

*Primary Examiner* — Carlos Lugo
(74) *Attorney, Agent, or Firm* — Quarles & Brady LLP

(57) ABSTRACT

A vehicle door handle assembly incorporating a dual sided adjustable male fastener. The dual sided adjustable male fastener is adapted to be installed to an initial predefined preliminary position from the inside of the structure and then adjusted from the exterior at the point of final assembly to establish a flush orientation of the handle relative to surrounding components.

15 Claims, 5 Drawing Sheets

(56) References Cited

U.S. PATENT DOCUMENTS

| | | | | | |
|---|---|---|---|---|---|
| 4,061,373 | A | | 12/1977 | Revell | |
| 4,074,464 | A | | 2/1978 | McCay | |
| 4,387,535 | A | | 6/1983 | Corbo | |
| 5,078,537 | A | | 1/1992 | Nomura | |
| 5,093,976 | A | | 3/1992 | Malinow et al. | |
| 5,284,373 | A | * | 2/1994 | Watson | E05B 79/06 292/DIG. 64 |
| 5,340,174 | A | * | 8/1994 | Bender | E05B 79/06 292/DIG. 31 |
| 5,377,450 | A | | 1/1995 | Varajon | |
| 5,713,705 | A | | 2/1998 | Grunbichler | |
| 5,762,387 | A | | 6/1998 | Edgerly et al. | |
| 5,810,531 | A | | 9/1998 | Tershay | |
| 6,039,366 | A | | 3/2000 | Lewis | |
| 6,065,186 | A | | 5/2000 | Jermyn, Jr. | |
| 6,309,132 | B1 | | 10/2001 | Jakob et al. | |
| 6,886,874 | B2 | | 5/2005 | Abe | |
| 7,091,433 | B2 | | 8/2006 | Meagher et al. | |
| 7,404,588 | B2 | | 7/2008 | Gabsch et al. | |
| 7,540,699 | B2 | | 6/2009 | Selle | |
| 8,857,867 | B2 | | 10/2014 | Saitou | |
| 10,876,327 | B2 | | 12/2020 | Wleklinski et al. | |
| 2006/0282987 | A1 | | 12/2006 | Shih et al. | |
| 2008/0095593 | A1 | | 4/2008 | McLean et al. | |
| 2011/0012378 | A1 | | 1/2011 | Ueno et al. | |
| 2015/0137535 | A1 | | 5/2015 | Rosales et al. | |
| 2017/0066312 | A1 | | 3/2017 | Coutier et al. | |

FOREIGN PATENT DOCUMENTS

| | | | |
|---|---|---|---|
| DE | 19837662 | A1 | 4/1999 |
| EP | 2090728 | A2 | 8/2009 |
| EP | 3399197 | A1 | 11/2018 |
| FR | 2876405 | A1 | 4/2006 |
| GB | 1398981 | A | 6/1975 |
| GB | 2253435 | A | 9/1992 |
| JP | 7317403 | | 12/1995 |
| WO | 03090004 | A1 | 10/2003 |

* cited by examiner

SINGLE AXIS ADJUSTMENT FEATURE FOR FLUSH DOOR HANDLES

CROSS-REFERENCE TO RELATED APPLICATIONS

This application is a continuation of U.S. patent application Ser. No. 15/551,475, filed Aug. 16, 2017, which represents the national phase filing of International Application No. PCT/US2016/018621, filed Feb. 19, 2016, which claims the benefit of, and priority from, U.S. provisional patent application No. 62/134,677 having a filing date of Mar. 18, 2015. The contents of such priority applications are hereby incorporated by reference in their entirety as if fully set forth herein.

TECHNICAL FIELD

The present disclosure relates to automotive components, and more particularly, to an adjustment feature for use in installing a flush door handle assembly in a vehicle. The adjustment feature permits the control of the flush orientation of the handle relative to surrounding parts during installation.

BACKGROUND OF THE DISCLOSURE

Door handle assemblies in vehicles are well known. Such assemblies are generally desired to be substantially flush with surrounding components. Accordingly, it is known to control the depth of a door handle assembly.

In the past, a set screw has been used to establish a desired flush position. However, such prior set screws may sometimes be over driven when installing the screw to the handle assembly. The set screw can also be driven too far during adjustment to set the handle to a flush position. Such over driving may cause damage and/or prevent proper flush setting. Accordingly, an improved adjustment feature would present a useful advancement over the prior art.

SUMMARY

The present disclosure offers advantages and alternatives relative to prior constructions by providing a door handle adjustment feature incorporating a dual sided adjustable male fastener in combination with a complimentary acceptance opening within the handle structure. The dual sided adjustable male fastener may be installed to an initial predefined preliminary position from the inside of the structure and then adjusted from the exterior at the point of final assembly to establish a flush orientation of the handle relative to surrounding components. The adjustment feature may accommodate greater variations of surrounding components such as sheet metal, mounting components and the like.

In accordance with one exemplary feature, the present disclosure provides a vehicle door handle assembly including a support plate disposed in overlying relation to a biasing spring. The support plate is positioned at an interior of a mating component such that the mating component at least partially surrounds the support plate. The support plate has an exterior face projecting away from the biasing spring and a back face projecting towards the biasing spring. A transverse passageway extends across a thickness dimension of the support plate between the exterior face and the back face. The handle assembly further includes a dual sided adjustable male fastener adapted for threaded mating engagement within the transverse passageway. The dual sided adjustable male fastener includes a proximal head having a proximal tool engagement indenture and a distal nipple having a distal tool engagement indenture. The dual sided adjustable male fastener further includes a threaded shank portion disposed between the proximal head and the distal nipple. The dual sided adjustable male fastener projects in threaded mating relation into the transverse passageway such that the back face is oriented in substantially opposing relation to the proximal head. The dual sided adjustable male fastener has an operative length such that at least a portion of the distal nipple projects outwardly from the transverse passageway when the dual sided adjustable male fastener is fully inserted. The operative length is such that the proximal head will engage the biasing spring when the distal nipple is substantially flush with an entrance to the transverse passageway at the exterior face.

While exemplary features of the disclosure are illustrated and will hereinafter be described in connection with certain potentially preferred embodiments and practices, it is to be understood that in no event is the disclosure limited to such illustrated and described embodiments and practices. On the contrary, it is intended that the present disclosure shall extend to all alternatives and modifications as may embrace the general principles of this disclosure within the full and true spirit and scope thereof.

Figure 1:
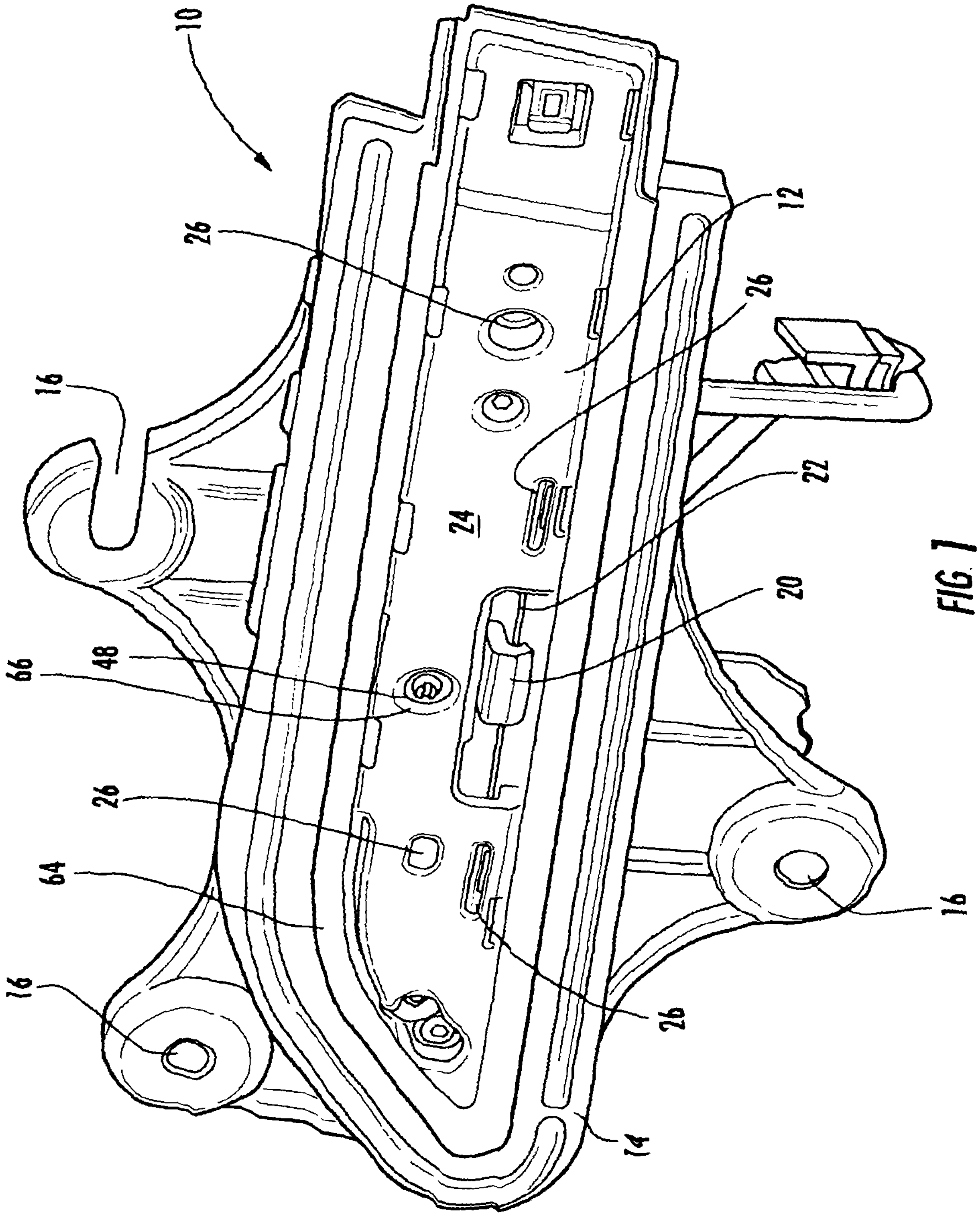
FIG. 1 is a schematic perspective view of an exemplary door handle assembly without a cover illustrating an outer support component mounted within a surrounding mating component.

Before various embodiments of the disclosure are explained in detail, it is to be understood that the disclosure is not limited in its application to the details of construction and the arrangements of the components set forth in the following description or illustrated in the drawings. The disclosure is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DESCRIPTION

Exemplary features of the present disclosure will now be described through reference to the various figures, wherein like elements are designated by like reference numerals in the various views. Referring now to the drawings, FIG. 1 is a view of an exemplary door handle assembly 10 without a cover so as to illustrate various internal components. As shown, the door handle assembly 10 incorporates an outer support component 12 in the form of a plate housed at the interior of a surrounding mating component 14. As will be appreciated, the mating component 14 includes an arrangement of perimeter attachment openings 16 adapted to receive male connectors such as pins, male fasteners or the like (not shown) for connection to a backing structure in a manner as will be well known to those of skill in the art.

The outer support component 12 is substantially planar and provides a protective structural support covering for internal components 18 of the door handle assembly 10 (FIG. 4) including an operative hooking latch 20 and complementary wire 22 which operate in a well known manner during operation of the door handle assembly 10.

In the illustrated exemplary construction, the outer support component 12 includes a substantially flat exterior face 24 with a plurality of cutouts 26 disposed therein for access to the underlying operative components of the door handle assembly 10. By way of example only, and not limitation, the outer support component may be formed as a unitary structure from a suitable plastic material such as acetal resin, Nylon 6, polyester or the like using techniques such as injection molding and the like. However, it is also contemplated that other structural materials such as metals, composites, and the like may likewise be utilized if desired.

Figure 2:
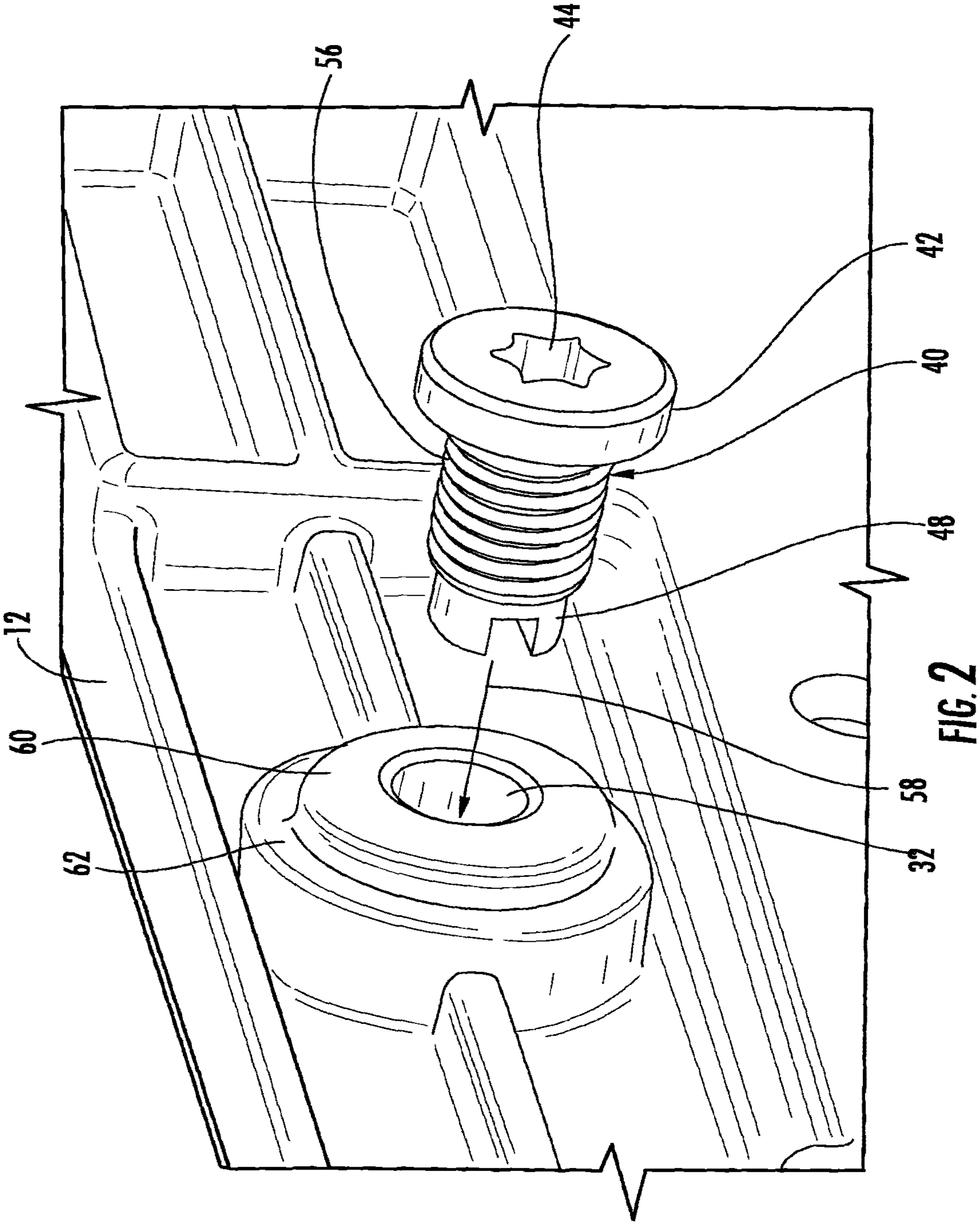
FIG. 2 is a schematic exploded view illustrating a dual sided adjustable male fastener oriented for insertion within a complementary female opening in the outer support component of FIG. 1.
Figure 3:
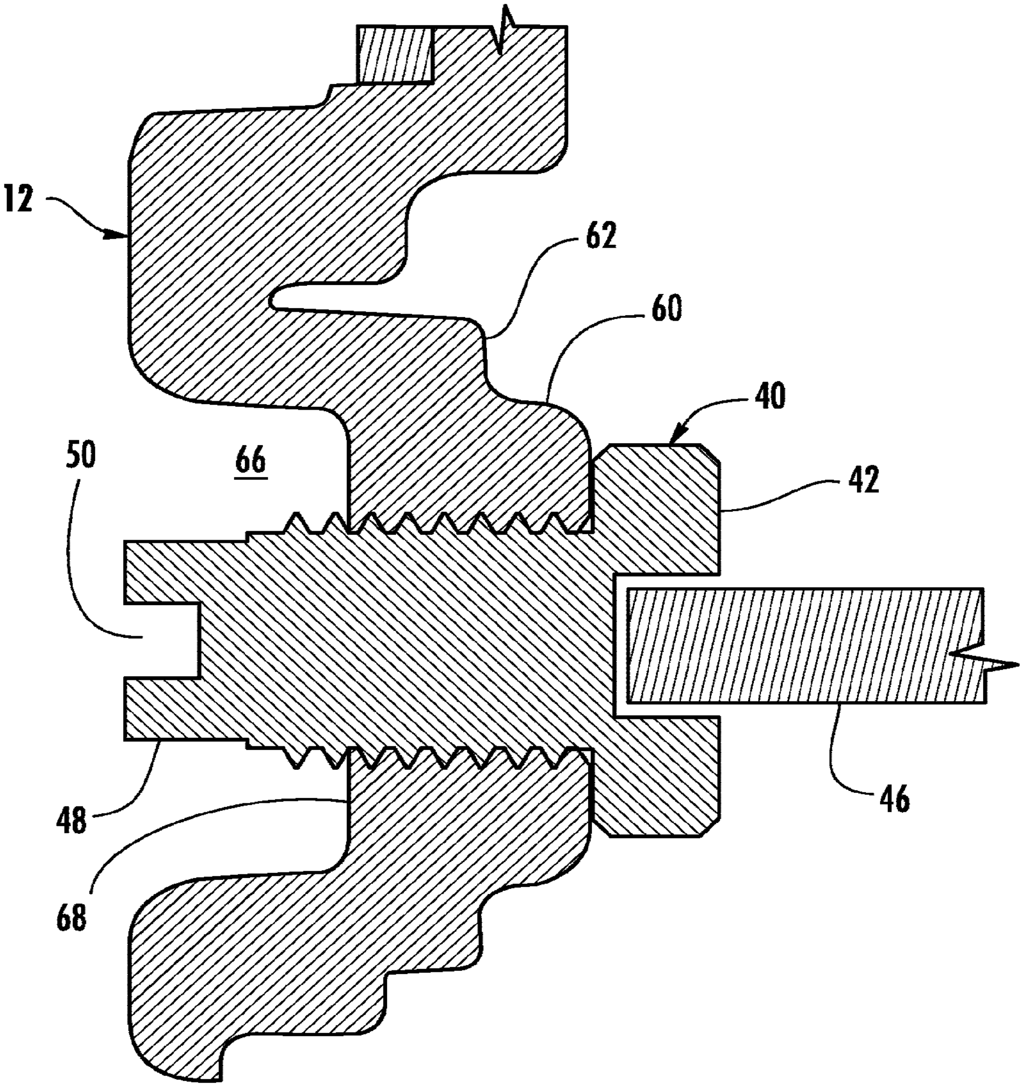
FIG. 3 is a schematic cut-away view illustrating the engagement between the dual sided adjustable male fastener and complementary female opening of FIG. 2 in the outer support component of FIG. 1.

In the illustrated exemplary construction, the outer support component 12 includes a transverse passageway 32 extending across the thickness dimension of the outer support component 12 (FIG. 2). The transverse passageway 32 defines a female opening for acceptance and threaded retention of a dual sided adjustable male fastener 40 as best seen in FIGS. 2 and 3. In accordance with the present disclosure, the dual sided adjustable male fastener 40 is used in conjunction with the transverse passageway 32 to establish and maintain a proper depth setting for the outer support component 12 relative to the surrounding mating component 14. Such a proper depth setting facilitates proper function while avoiding damage that may result from excessive compression.

As best illustrated in FIG. 2, the dual sided adjustable male fastener 40 may include a proximal head 42 of enhanced diameter having a proximal tool engagement indenture 44 adapted to engage a driver 46 such as a torx driver, star driver or the like as shown in FIG. 3. Of course, other forms of indentures adapted to engage other drivers may likewise be used if desired.

Figure 4:
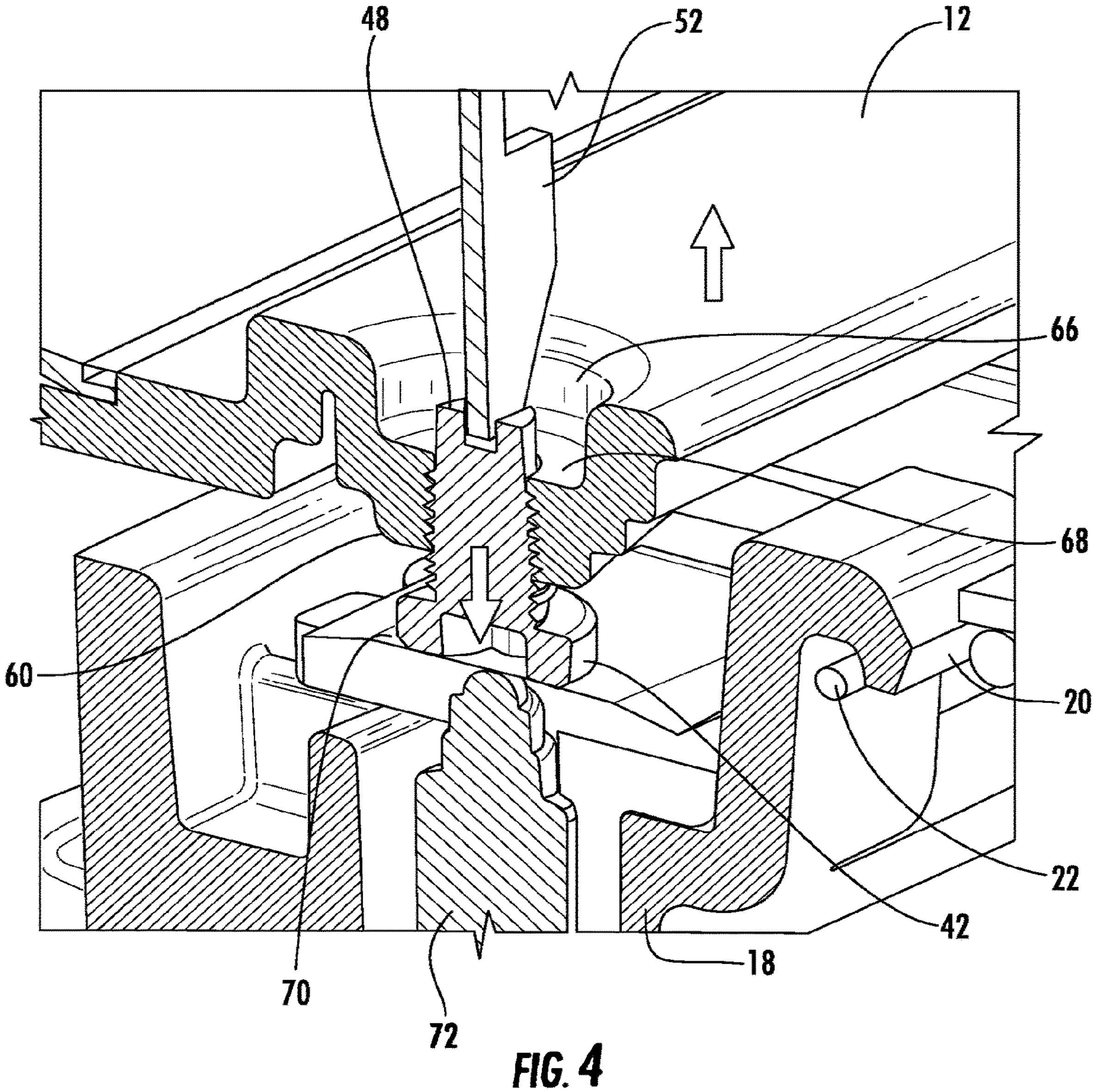
FIG. 4 is a schematic cut-away view illustrating adjustment between the outer support component of FIG. 1 and surrounding mating component using the dual sided adjustable male fastener of FIG. 2.

As illustrated, the dual sided adjustable male fastener 40 may also include a distal nipple 48 of reduced diameter having a distal tool engagement indenture 50 adapted to engage a driver 52 such as a flat head screw driver or the like as shown in FIG. 4. Of course, other forms of indentures adapted to engage other drivers may likewise be used if desired.

In the illustrated exemplary construction, the dual sided adjustable male fastener 40 further includes a threaded shank portion 56 disposed between the proximal head 42 and the distal nipple 48. As shown the threaded shank portion 56 has an effective diameter which is less than the diameter of the proximal head 42 and greater than the diameter of the distal nipple 48.

As best illustrated through joint reference to FIGS. 1-3, at a preliminary stage of assembly, the dual sided adjustable male fastener 40 may be matedly inserted in threaded relation into the transverse passageway 32 from a position on the back of the outer support component 12 using the driver 46. As shown, the dual sided adjustable male fastener 40 is advanced along an axis line 58 in coaxial relation to transverse passageway 32. As best seen in FIG. 2, at the location of insertion of the dual sided adjustable male fastener 40, the transverse passageway 32 may be surrounded by a substantially annular raised boss 60 which projects rearwardly away from a hub 62 at the back of the outer support component 12 in substantially coaxial relation to passageway 32 and axis line 58.

As shown in FIG. 3, at the preliminary stage of assembly, the dual sided adjustable male fastener 40 may be inserted into the passageway 32 to a depth such that the raised boss 60 engages the proximal head 42 and thereby blocks further insertion. In this regard, the interface between the raised boss 60 and the proximal head 42 will prevent the dual sided adjustable male fastener 40 from being over driven into the raised boss 60. As illustrated, the dual sided adjustable male fastener 40 has an operative length such that at least a portion of the distal nipple 48 projects outwardly from the transverse passageway 32 when the dual sided adjustable male fastener 40 is fully inserted so as to be in contacting relation to the raised boss 60.

In accordance with one exemplary practice, after the dual sided adjustable male fastener 40 is assembled into the transverse passageway 32, the outer support component 12 may be assembled to the proper location relative to the mating component 14. In this regard, at the point of vehicle assembly, a sheet metal pocket 64 may be positioned between the perimeter of the outer support component 12 and the mating component 14 by an assembly tool to establish the desired gap between outer support component 12 and mating component 14. Simultaneously, the same tool may set the depth of the exterior face 24 of the outer support component 12 to be substantially flush relative to the mating component 14.

Figure 5:
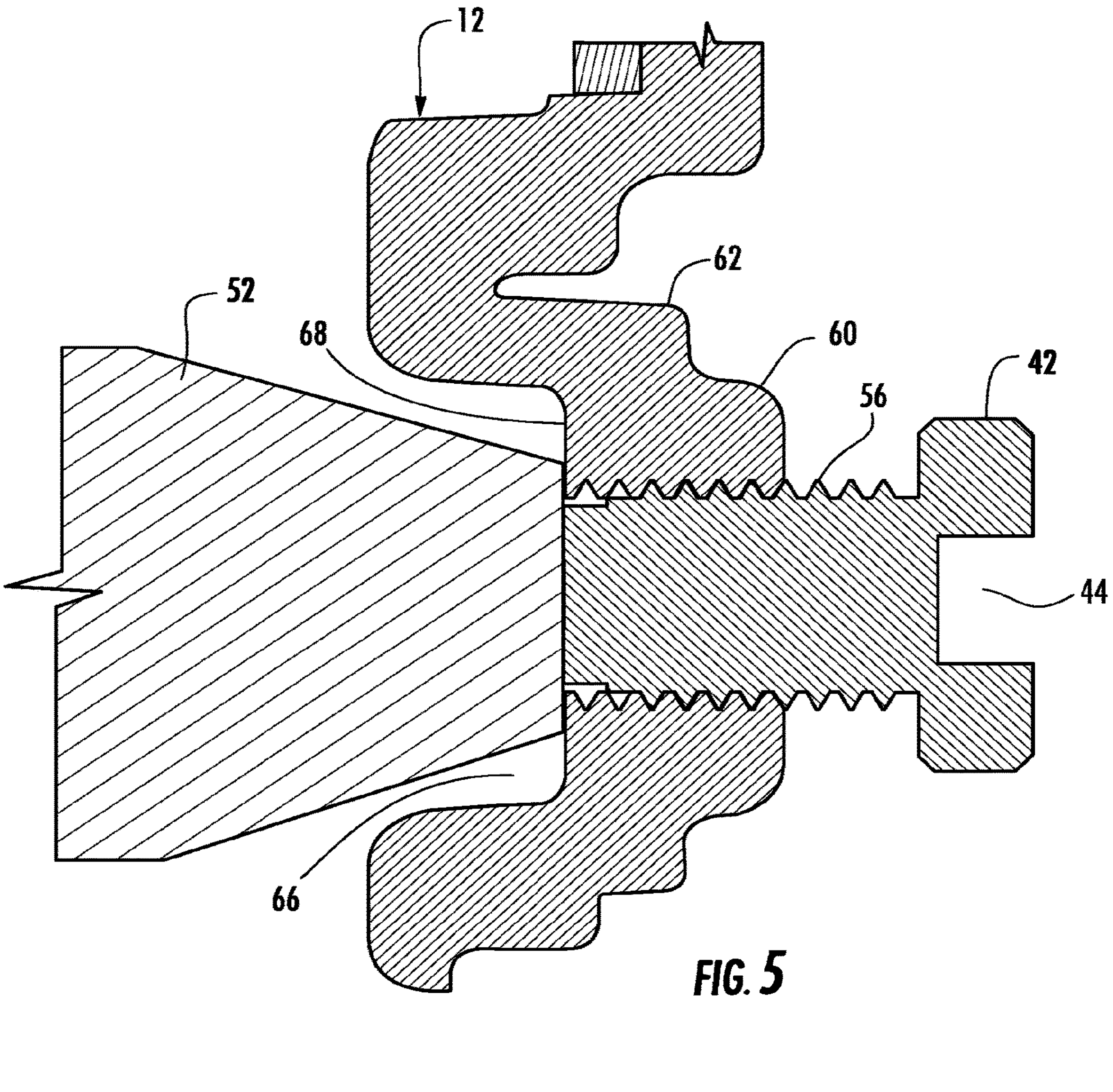
FIG. 5 is a schematic cut-away view illustrating the adjustment stop feature on the outer support component.

As will be appreciated, after the outer support component 12 is assembled to the relative to the mating component 14, it may be desirable to engage in a final adjustment to lock in the desired depth of the outer support component 12. Referring jointly to FIGS. 1, 4 and 5, it may be seen that such final adjustment may be accomplished by applying torque to the dual sided adjustable male fastener 40 from a position at the exterior face 24. By way of example only, and not limitation, such torque may be applied by use of a driver 52 such as a flat head screw driver or the like engaging the distal tool engagement indenture 50 at the distal nipple 48.

As best illustrated through reference to FIGS. 3-5, it may be seen that at the outwardly projecting exterior face 24 of the outer support component 12, the passageway 32 may be surrounded by a cavity 66 defining a depression with a substantially flat, annular base 68 extending radially outboard from the passageway 32 in substantially coaxial relation to passageway 32 and axis line 58. As shown in FIG. 5, the diameter of the cavity 66 may be set to accept insertion of the driver 52 such that the dual sided adjustable male fastener 40 may be adjusted by application of torque from the position in FIG. 3 towards the position shown in FIG. 5. As will be appreciated, in the position of FIG. 5, the terminal end of distal nipple 48 will be substantially flush with the surrounding annular base 68. Moreover, the annular base 68 will limit the degree of movement of the dual sided adjustable male fastener 40 by blocking the driver 52 once the distal nipple 48 has reached the flush position.

In the illustrated exemplary construction, the door handle assembly 10 may include a dome spring 70 (FIG. 4) or other resilient support positioned in opposing relation to the raised boss 60. Thus, as the dual sided adjustable male fastener 40 is driven inwardly, the proximal head 42 will engage dome spring 70 which will provide underlying support. As will be appreciated, this underlying support aids in preventing the dual sided adjustable male fastener 40 from moving rearwardly in the passageway due to vibration during use.

In the illustrated exemplary construction, the dome spring 70 is provided with an underlying support 72 which limits deflection. Accordingly, as the dual sided adjustable male fastener 40 is moved inwardly, increasing resistance is encountered until no further inward movement can be accommodated.

As will be understood, once the dual sided adjustable male fastener 40 can no longer be advanced inwardly due to blockage by the dome spring 70, the application of further torque will cause the outer support component 12 to be lifted upwardly in the manner of an Archimedes screw motion. Such upward motion can take place until the annular base 68 ultimately engages the driver 52 in the orientation shown in FIG. 5. As will be appreciated, this system facilitates extremely fine depth adjustment in the order of about 2 mm. Of course, adjustment can also be ceased before this position is reached if the desired orientation has been achieved.

Once the handle gap is established, and a flush orientation is achieved, a decorative cap (not shown) may be snapped onto the door handle assembly 10 and the door handle assembly 10 is then ready to be operated. In this condition, the outer support component 12 will provide the desired internal support while remaining flush with the surrounding mating component 14.

Of course, variations and modifications of the foregoing are within the scope of the present disclosure. The use of the terms "a" and "an" and "the" and similar referents in the context of describing the invention (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A door handle assembly for a vehicle door, comprising:
- a mating component configured to be mounted to an interior surface of the vehicle door;
- an outer support component configured to be positioned substantially flushed to an exterior surface of the vehicle door, the outer support component defining a transverse passageway;
- a biasing element configured to be positioned between the mating component and the outer support component, the biasing element configured to be at least partially aligned with the transverse passageway; and
- an adjustment feature configured to adjust the position of the outer support component, the adjustment feature comprising a fastener configured to threadably engaged with the outer support component via the transverse passageway, the fastener including:
  - a head having a first tool indenture dimensioned to receive a first tool to adjust the fastener in a first direction, and
  - a nipple opposite the head, the nipple having a second tool indenture dimensioned to receive a second tool to adjust the fastener in a second direction, and
- an underlying support to limit deflection of the biasing element,
- wherein the head of the fastener is configured to engage the biasing element adjacent to the first indenture.

2. The door handle assembly of claim 1, wherein the mating component defines an interior, and the biasing element is configured to be fitted within the interior.

3. The door handle assembly of claim 2, wherein the support component is configured to be at least partially disposed within the interior.

4. The door handle assembly of claim 3, wherein the head defines a first outer diameter, and the nipple defines a second outer diameter that is less than the first outer diameter.

5. The door handle assembly of claim 4, wherein the position of the outer support component is configured to be adjusted by rotating the fastener within the transverse passageway by way of the second tool engaging the nipple at the second indenture.

6. The door handle assembly of claim 1, wherein the second tool indenture is a slot.

7. The door handle assembly of claim 5, wherein the outer support component is moveable relative to the mating component between a retracted position and an extended position.

8. The door handle assembly of claim 7, wherein the head of the fastener contacts the biasing element when the outer support component is in the retracted position.

9. The door handle assembly of claim 7, wherein the head of the fastener contacts the biasing element when the outer support component is in the extended position.

10. The door handle assembly of claim 8, wherein, when the fastener engages the biasing element, the biasing element urges the outer support component away from the mating component.

11. The door handle assembly of claim 9, wherein the nipple is flush with a base of the outer support component when the outer support component is in the extended position.

12. The door handle assembly of claim 1, wherein the biasing element is a dome spring.

13. The door handle assembly of claim 1, wherein the first tool indenture is dimensioned to engage a torx driver and the second tool indenture is dimensioned to engage a flat head driver.

14. The door handle assembly of claim 1, wherein the transverse passageway is surrounded by a raised boss that extends toward the mating component from the outer support component, and wherein a cavity is formed in the outer support component opposite the raised boss, the cavity defining a flat annular base.

15. The door handle assembly of claim 14, wherein the second tool is configured to engage the flat annular base when the nipple is flush with the flat annular base.

* * * * *